(No Model.)
W. D. B. SMITH.
UNDERGROUND TELEGRAPH LINE.
No. 256,397. Patented Apr. 11, 1882.
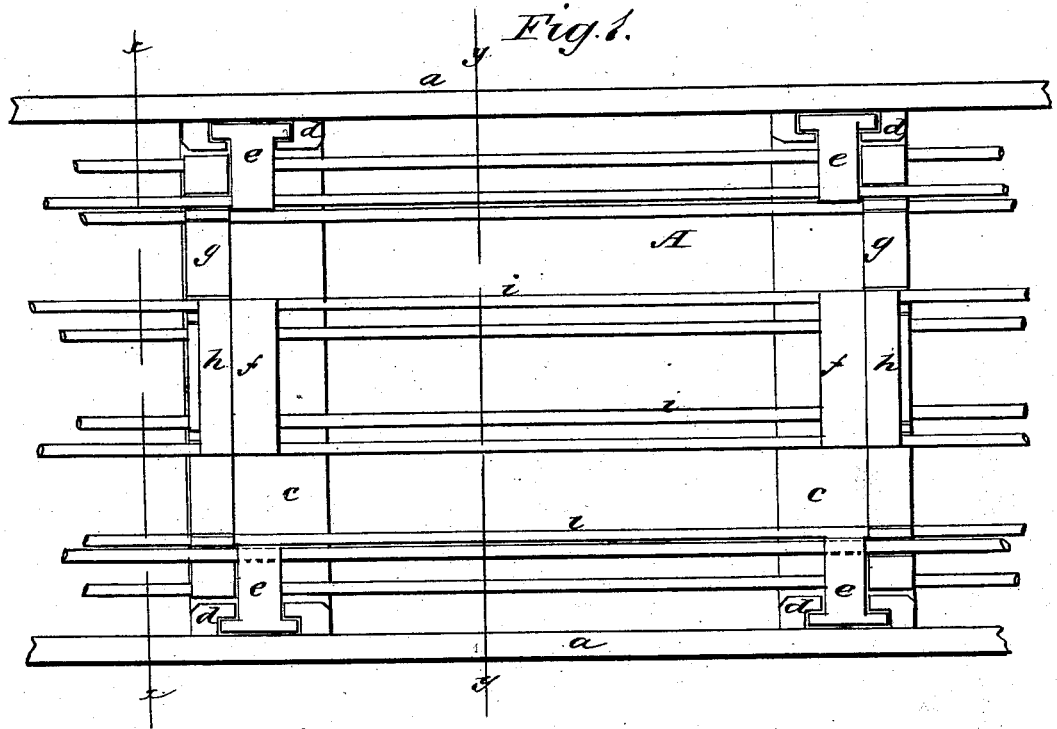
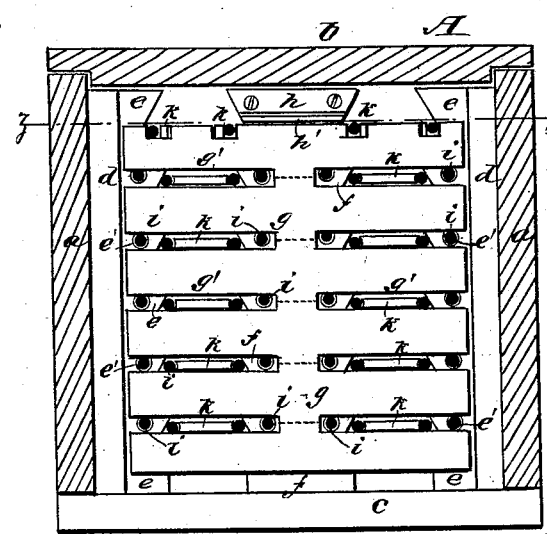
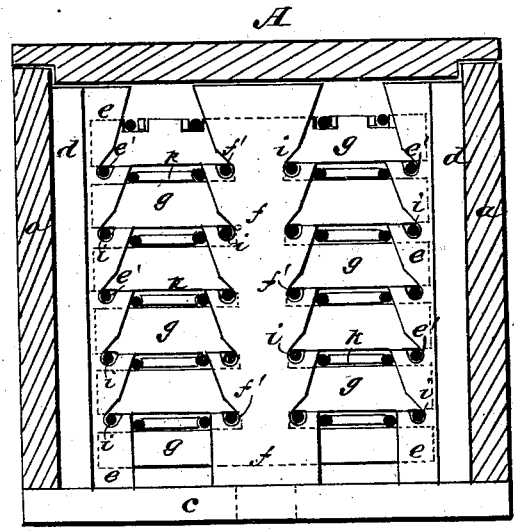
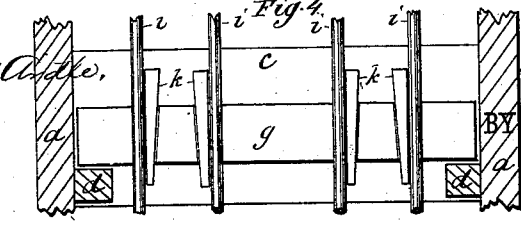
WITNESSES:
Francis McArdle,
C. Sedgwick
INVENTOR:
W. D. B. Smith
BY Munn & Co.
ATTORNEYS.

UNITED STATES PATENT OFFICE.

WARREN D'B. SMITH, OF BOSTON, MASSACHUSETTS.

UNDERGROUND-TELEGRAPH LINE.

SPECIFICATION forming part of Letters Patent No. 256,397, dated April 11, 1882.

Application filed December 5, 1881. (No model.)

*To all whom it may concern:*

Be it known that I, WARREN D'B. SMITH, of Boston, Suffolk county, Massachusetts, have invented a new and useful Improvement in Underground-Telegraph Lines, of which the following is a full, clear, and exact description.

The object of my invention is to provide for conveniently laying underground-telegraph wires and for access to such wires at all times. It consists in a receiving box or trunk provided with wire holders and clamps, as hereinafter described and claimed.

Reference is to be had to the accompanying drawings, forming a part of this specification, in which similar letters of reference indicate corresponding parts in all the figures.

Figure 1 is a plan view of the box or trunk with the cover removed. Figs. 2 and 3 are cross-sections on the lines $xx$ and $yy$, respectively, of Fig. 1. Fig. 4 is a horizontal section through the lines $zz$ of Fig. 2.

The box or trunk A is made of wood or other suitable material, and is composed of continuous sides $aa$, top $b$, in hinged or removable sections of suitable length, and bottom pieces or strips, $c$, that connect the sides at intervals, the spaces between being open.

At suitable intervals the box is provided with dovetail flanges $d$, which receive the wire-holders $e$. The wire-holders are strips of suitable material, having diagonal slots $e'$, that receive and retain the wires, and are readily removable from their holding-flanges $d$, so that they may be placed either end up. Between the holders $e$, at each side, are posts $f$, fixed on bars $c$, and slotted at $f'$ to receive the wires.

In connection with the holders $ef$, I provide slotted plates $g$, which are placed against the flanges $d$, and beneath flanges $h$ on the upper end of posts $f$, where they are clamped by wedges $h'$. The slots $g'$ of these plates are placed to allow passages of the wires $i$, that are supported by the holders $ef$, and the bars formed by the slots hold the wires down. The slots $g'$ also receive independent wires clamped by keys or wedges $k$, as shown. It will be seen that the wires are thus held securely and separate, whether the line be straight or bending sidewise or upward or downward.

The box is to be placed preferably along the curb of the streets in cities, and the wires are thus readily accessible. The box or trunk will contain a large number of wires without risk of their becoming misplaced. The open bottom allows water to run away.

Instead of a single plate slotted to form clamping-bars $g'$, the plate may be divided on the dotted line shown in Fig. 2 to form separate pieces.

Having thus described my invention, I claim as new and desire to secure by Letters Patent—

The clamping-plate $g$, provided with slots $g'$, in combination with the box A and slotted wire-holders $ef$, substantially as shown and described.

WARREN D'BELL SMITH.

Witnesses:
 GODFREY MORSE,
 JOHN HERBERT.